US012131555B2

(12) United States Patent
Yu et al.

(10) Patent No.: US 12,131,555 B2
(45) Date of Patent: Oct. 29, 2024

(54) SYSTEMS AND METHODS FOR PROVIDING TRAFFIC LIGHT REGION OF INTEREST PARAMETERS TO AN AUTONOMOUS VEHICLE

(71) Applicant: GM Global Technology Operations LLC, Detroit, MI (US)

(72) Inventors: Bo Yu, Troy, MI (US); Ashok Yendluri, Farmington, MI (US); Lawrence Andrew Bush, Shelby Township, MI (US); Kevin Khoi Hoang, Rochester Hills, MI (US); Donald K. Grimm, Utica, MI (US); Fan Bai, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 381 days.

(21) Appl. No.: 17/686,023

(22) Filed: Mar. 3, 2022

(65) Prior Publication Data
US 2023/0282004 A1    Sep. 7, 2023

(51) Int. Cl.
| G06V 10/25 | (2022.01) |
| B60W 60/00 | (2020.01) |
| G06F 17/14 | (2006.01) |
| G06V 20/58 | (2022.01) |
| G08G 1/0967 | (2006.01) |
| H04W 4/46 | (2018.01) |

(52) U.S. Cl.
CPC ......... *G06V 20/584* (2022.01); *B60W 60/001* (2020.02); *G06F 17/142* (2013.01); *G06V 10/25* (2022.01); *G08G 1/096791* (2013.01); *H04W 4/46* (2018.02); *B60W 2556/40* (2020.02); *B60W 2556/65* (2020.02)

(58) Field of Classification Search
CPC ...... G06V 20/584; G06V 10/25; G06V 10/74; G06V 10/7715; B60W 60/001; B60W 2556/40; B60W 2556/65; G06F 17/142; G08G 1/096791; G08G 1/09623; G08G 1/096725; G08G 1/096741; H04W 4/46; H04W 4/02; G01C 21/30
USPC ....................................................... 382/104
See application file for complete search history.

(56) References Cited

U.S. PATENT DOCUMENTS

2021/0024082 A1* 1/2021 Hayashi .......... B60W 30/18154

* cited by examiner

*Primary Examiner* — Stephen P Coleman
(74) *Attorney, Agent, or Firm* — Vivacqua Crane, PLLC

(57) ABSTRACT

A sequence of images and a vehicle location associated with each of the images is received at a traffic light ROI management system. At least one traffic light is detected in each image. A ECS traffic light ROI is defined for each image. The ECS traffic light ROI encloses the detected traffic lights. A visual feature template is generated for each image. The visual feature template is based on the ECS traffic light ROI for the image. Each visual feature template is mapped to the vehicle location associated with the image to a HD map. The HD map is transmitted to an autonomous vehicle to enable the autonomous vehicle to identify a real-time traffic light ROI in a real-time image based on a match between a first visual feature template and real-time visual features of the real-time image at the vehicle location associated with the first visual feature template.

20 Claims, 9 Drawing Sheets

SYSTEMS AND METHODS FOR PROVIDING TRAFFIC LIGHT REGION OF INTEREST PARAMETERS TO AN AUTONOMOUS VEHICLE

INTRODUCTION

The technical field generally relates to autonomous vehicles, and more particularly relates to systems and methods for generating a region of interest for traffic light detection.

The automated driving systems (ADS) of autonomous vehicles often rely on images captured by vehicle cameras to detect traffic lights on road segments. The images captured by the vehicle cameras may be high resolution images, such as for example, 8-megapixel images. The use of on-board computing resources at the autonomous vehicle to implement object detection algorithms to detect traffic lights in the images may result in increased computer resource usage and traffic light detection latencies.

In some cases, a road segment leading to a traffic light may include complex road topologies, such as for example, bumps, curves, or hills. Compensating for complex road topologies to enable accurate detection of traffic lights may place additional strain on the computational resource at the autonomous vehicle.

SUMMARY

In an embodiment, an edge computing system (ECS) for providing traffic light region of interest (ROI) parameters to an autonomous vehicle includes a processor and a memory. The memory includes instructions that upon execution by the processor cause the processor to receive a sequence of images and a vehicle location associated with each of the images from a first autonomous vehicle; detect at least one traffic light in each image in the sequence of images; define a ECS traffic light ROI for each image in the sequence of images, the ECS traffic light ROI for each image enclosing the at least one traffic light in the image; generate a visual feature template for each image in the sequence of images, the visual feature template for each image being based on the ECS traffic light ROI for the image; map each visual feature template for each image in the sequence of images to the vehicle location associated with the image to a high definition (HD) map; and transmit the HD map to a second autonomous vehicle to enable the second autonomous vehicle to identify a real-time traffic light ROI in a real-time image based on a match between a first visual feature template of the HD map and real-time visual features associated with the real-time image at the vehicle location associated with the first visual feature template.

In an embodiment, each of the images in the sequence of images is in a forward time order and the memory further includes instructions that upon execution by the processor cause the processor to define the ECS traffic light ROI in each image in the sequence of images in a reverse time order.

In an embodiment, the memory further includes instructions that upon execution by the processor cause the processor to discard a first image of the sequence of images upon a determination that the at least one detected traffic light in first image falls below a traffic light size threshold.

In an embodiment, the memory further includes instructions that upon execution by the processor cause the processor to generate the visual feature template for each image in the sequence of images in the frequency domain by applying a Fast Fourier transform to the ECS traffic light ROI of the image.

In an embodiment, the memory further includes instructions that upon execution by the processor cause the processor to select a second visual feature template based on a first image of the sequence of images, the first image being associated with a first vehicle location; determine whether the second visual feature template can be used to identify a first ECS traffic light ROI in a second image of the sequence of images based on a match between the second visual feature template and visual features associated with the second image, the second image being associated with a second vehicle location; and map the second visual feature template to the first and second vehicle locations on the HD map based on the determination.

In an embodiment, the memory further includes instructions that upon execution by the processor cause the processor to determine ROI offsets of the ECS traffic light ROI in consecutive pairs of images in the sequence of images based on a movement of the ECS traffic light ROI in the consecutive pairs of images; generate a ROI scaling ratio for each of the vehicle locations associated with each of the images in the sequence of images based a relationship between each of the ROI offsets and the vehicle location associated with the ROI offset; and map each ROI scaling ratio to the vehicle location on the HD map associated with the ROI scaling ratio.

In an embodiment, the memory further includes instructions that upon execution by the processor cause the processor to transmit the HD map including the mapped ROI scaling ratios to the second autonomous vehicle to enable the second autonomous vehicle to adjust a size of the real time traffic light ROI in the real-time image in accordance with the ROI scaling ratio associated with the vehicle location of the second autonomous vehicle.

In an embodiment, a computer readable medium includes instructions stored thereon for providing traffic light region of interest (ROI) parameters to an autonomous vehicle, that upon execution by a processor, cause the processor to receive a sequence of images and a vehicle location associated with each of the images from a first autonomous vehicle; detect at least one traffic light in each image in the sequence of images; define a ECS traffic light ROI for each image in the sequence of images, the ECS traffic light ROI for each image enclosing the at least one traffic light in the image; generate a visual feature template for each image in the sequence of images, the visual feature template for each image being based on the ECS traffic light ROI for the image; map each visual feature template for each image in the sequence of images to the vehicle location associated with the image to a high definition (HD) map; and transmit the HD map to a second autonomous vehicle to enable the second autonomous vehicle to identify a real-time traffic light ROI in a real-time image based on a match between a first visual feature template of the HD map and real-time visual features associated with the real-time image at the vehicle location associated with the first visual feature template.

In an embodiment, the computer readable medium further includes instructions to cause the processor to receive the sequence of images in a forward time order; and define the ECS traffic light ROI in each image in the sequence of images in a reverse time order.

In an embodiment, the computer readable medium further includes instructions to cause the processor to discard a first image of the sequence of images upon a determination that the at least one detected traffic light in first image falls below a traffic light size threshold.

In an embodiment, the computer readable medium further includes instructions to cause the processor to generate the visual feature template for each image in the sequence of images in the frequency domain by applying a Fast Fourier transform to the ECS traffic light ROI of the image.

In an embodiment, the computer readable medium further includes instructions to cause the processor to select a second visual feature template based on a first image of the sequence of images, the first image being associated with a first vehicle location; determine whether the second visual feature template can be used to identify a first ECS traffic light ROI in a second image of the sequence of images based on a match between the second visual feature template and visual features associated with the second image, the second image being associated with a second vehicle location; and map the second visual feature template to the first and second vehicle locations on the HD map based on the determination.

In an embodiment, the computer readable medium further includes instructions to cause the processor to determine ROI offsets of the ECS traffic light ROI in consecutive pairs of images in the sequence of images based on a movement of the ECS traffic light ROI in the consecutive pairs of images; generate a ROI scaling ratio for each of the vehicle locations associated with each of the images in the sequence of images based a relationship between each of the ROI offsets and the vehicle location associated with the ROI offset; and map each ROI scaling ratio to the vehicle location on the HD map associated with the ROI scaling ratio.

In an embodiment, the computer readable medium further includes instructions to cause the processor to transmit the HD map including the mapped ROI scaling ratios to the second autonomous vehicle to enable the second autonomous vehicle to adjust a size of the real time traffic light ROI in the real-time image in accordance with the ROI scaling ratio associated with the vehicle location of the second autonomous vehicle.

In an embodiment, a method of providing traffic light region of interest (ROI) parameters to an autonomous vehicle includes receiving a sequence of images and a vehicle location associated with each of the images from a first autonomous vehicle at a traffic light ROI management system; detecting at least one traffic light in each image in the sequence of images at the traffic light ROI management system; defining a ECS traffic light ROI for each image in the sequence of images at the traffic light ROI management system, the ECS traffic light ROI for each image enclosing the at least one traffic light in the image; generating a visual feature template for each image in the sequence of images at the traffic light ROI management system, the visual feature template for each image being based on the ECS traffic light ROI for the image; mapping each visual feature template for each image in the sequence of images to the vehicle location associated with the image to a high definition (HD) map at the traffic light ROI management system; and transmitting the HD map from the traffic light ROI management system to a second autonomous vehicle to enable the second autonomous vehicle to identify a real-time traffic light ROI in a real-time image based on a match between a first visual feature template of the HD map and real-time visual features associated with the real-time image at the vehicle location associated with the first visual feature template.

In an embodiment, the method further includes receiving the sequence of images in a forward time order at the traffic light ROI management system; and defining the ECS traffic light ROI in each image in the sequence of images in a reverse time order at the traffic light ROI management system.

In an embodiment, the method further includes discarding a first image of the sequence of images upon a determination that the at least one detected traffic light in first image falls below a traffic light size threshold at the traffic light ROI management system.

In an embodiment, the method further includes generating the visual feature template for each image in the sequence of images in the frequency domain by applying a Fast Fourier transform to the ECS traffic light ROI of the image at the traffic light ROI management system.

In an embodiment, the method further includes selecting a second visual feature template based on a first image of the sequence of images at the traffic light ROI management system, the first image being associated with a first vehicle location; determining whether the second visual feature template can be used to identify a first ECS traffic light ROI in a second image of the sequence of images based on a match between the second visual feature template and visual features associated with the second image at the traffic light ROI management system, the second image being associated with a second vehicle location; and mapping the second visual feature template to the first and second vehicle locations on the HD map based on the determination at the traffic light ROI management system.

In an embodiment, the method further includes determining ROI offsets of the ECS traffic light ROI in consecutive pairs of images in the sequence of images based on a movement of the ECS traffic light ROI in the consecutive pairs of images at the traffic light ROI management system; generating a ROI scaling ratio for each of the vehicle locations associated with each of the images in the sequence of images based a relationship between each of the ROI offsets and the vehicle location associated with the ROI offset at the traffic light ROI management system; and mapping each ROI scaling ratio to the vehicle location on the HD map associated with the ROI scaling ratio at the traffic light ROI management system.

BRIEF DESCRIPTION OF THE DRAWINGS

Exemplary embodiments will hereinafter be described in conjunction with the following drawing figures, wherein like numerals denote like elements.

DETAILED DESCRIPTION

The following detailed description is merely exemplary in nature and is not intended to limit the application and uses. Furthermore, there is no intention to be bound by any expressed or implied theory presented in the preceding introduction, summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
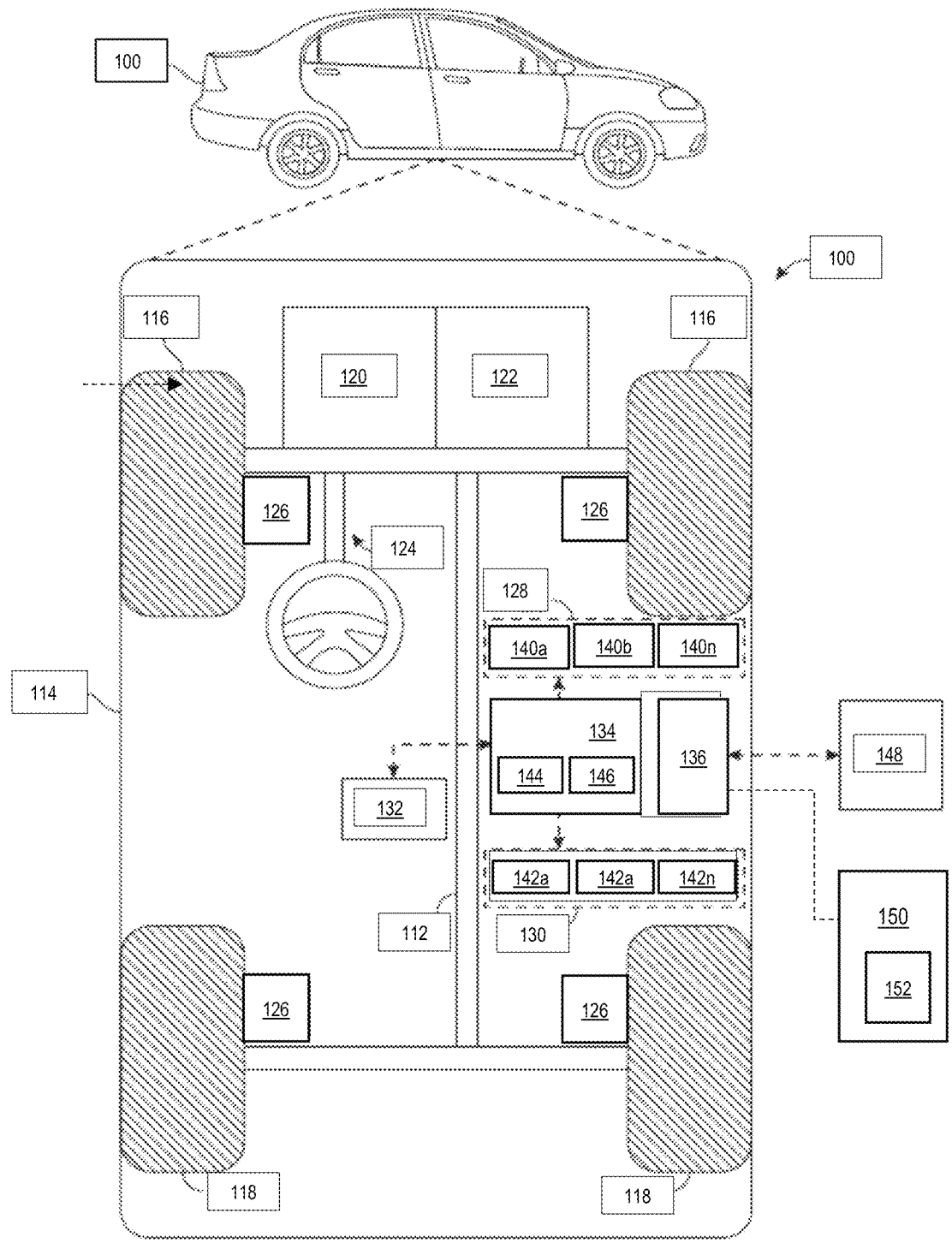
FIG. 1 is a functional block diagram representation of an autonomous vehicle communicatively coupled to an edge computing system (ECS) including an embodiment of a traffic light region of interest (ROI) management system.

Referring to FIG. 1, a functional block diagram representation of an autonomous vehicle communicatively coupled to an edge computing system (ECS) including an embodiment of a traffic light region of interest (ROI) management system is shown. The autonomous vehicle 100 generally includes a chassis 112, a body 114, front wheels 116, and rear wheels 118. The body 114 is arranged on the chassis 112 and substantially encloses components of the autonomous vehicle 100. The body 114 and the chassis 112 may jointly form a frame. The front wheels 116 and the rear wheels 118 are each rotationally coupled to the chassis 112 near a respective corner of the body 114.

The autonomous vehicle 100 is, for example, a vehicle that is automatically controlled to carry passengers from one location to another. While the autonomous vehicle 100 is depicted in the illustrated embodiment as a passenger car, other examples of autonomous vehicles include, but are not limited to, motorcycles, trucks, sport utility vehicles (SUVs), recreational vehicles (RVs), marine vessels, and aircraft. In an embodiment, the autonomous vehicle 100 is a so-called Level Four or Level Five automation system. A Level Four system indicates "high automation", referring to the driving mode-specific performance by an automated driving system (ADS) of all aspects of the dynamic driving task, even if a human driver does not respond appropriately to a request to intervene. A Level Five system indicates "full automation", referring to the full-time performance by an ADS of all aspects of the dynamic driving task under all roadway and environmental conditions that can be managed by a human driver.

As shown, the autonomous vehicle 100 generally includes a propulsion system 120, a transmission system 122, a steering system 124, a brake system 126, a vehicle sensor system 128, an actuator system 130, at least one data storage device 132, at least one controller 134, and a vehicle communication system 136. The propulsion system 120 may, in various embodiments, include an internal combustion engine, an electric machine such as a traction motor, and/or a fuel cell propulsion system. The transmission system 122 is configured to transmit power from the propulsion system 120 to the front wheels 116 and the rear wheels 118 according to selectable speed ratios. According to various embodiments, the transmission system 122 may include a step-ratio automatic transmission, a continuously-variable transmission, or other appropriate transmission. The brake system 126 is configured to provide braking torque to the front wheels 116 and the rear wheels 118. The brake system 126 may, in various embodiments, include friction brakes, brake by wire, a regenerative braking system such as an electric machine, and/or other appropriate braking systems. The steering system 124 influences a position of the front wheels 116 and the rear wheels 118. While depicted as including a steering wheel for illustrative purposes, in some embodiments contemplated within the scope of the present disclosure, the steering system 124 may not include a steering wheel.

The vehicle sensor system 128 includes one or more vehicle sensing devices 140a-140n that sense observable conditions of the exterior environment and/or the interior environment of the autonomous vehicle 100. Examples of vehicle sensing devices 140a-140n include, but are not limited to, radars, lidars, global positioning systems, optical cameras, thermal cameras, ultrasonic sensors, and/or other sensors. The actuator system 130 includes one or more actuator devices 142a-142n that control one or more vehicle features such as for example, but not limited to, the propulsion system 120, the transmission system 122, the steering system 124, and the brake system 126. In various embodiments, the vehicle features can further include interior and/or exterior vehicle features such as for example, but are not limited to, doors, a trunk, and cabin features such as for example air, music, and lighting.

The vehicle communication system 136 is configured to wirelessly communicate information to and from other entities ("vehicle-to-everything (V2X)" communication). For example, the vehicle communication system 136 is configured to wireless communicate information to and from other vehicles 148 ("vehicle-to-vehicle (V2V)" communication), to and from driving system infrastructure ("vehicle to infrastructure (V2I)" communication), remote systems, to and from an ECS 150 and/or personal devices. In an embodiment, the vehicle communication system 136 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels designed for automotive use and a corresponding set of protocols and standards.

The data storage device 132 stores data for use in automatically controlling the autonomous vehicle 100. The data storage device 132 may be part of the controller 134, separate from the controller 134, or part of the controller 134 and part of a separate system.

The controller 134 includes at least one processor 144 and a computer readable storage device 146. The computer readable storage device 146 may also be referred to a computer readable media 146 and a computer readable medium 146. The processor 144 can be any custom made or commercially available processor, a central processing unit (CPU), a graphics processing unit (GPU), an auxiliary processor among several processors associated with the controller 134, a semiconductor-based microprocessor (in the form of a microchip or chip set), a macroprocessor, any combination thereof, or generally any device for executing instructions. The computer readable storage device 146 may include volatile and nonvolatile storage in read-only memory (ROM), random-access memory (RAM), and keep-alive memory (KAM), for example. KAM is a persistent or non-volatile memory that may be used to store various operating variables while the processor 144 is powered down. The computer-readable storage device 146 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 134 in controlling the autonomous vehicle 100.

The instructions may include one or more separate programs, each of which comprises an ordered listing of executable instructions for implementing logical functions. The instructions, when executed by the processor 144, receive and process signals from the vehicle sensor system 128, perform logic, calculations, methods and/or algorithms for automatically controlling the components of the autonomous vehicle 100, and generate control signals to the actuator system 130 to automatically control one or more components of the autonomous vehicle 100 based on the logic, calculations, methods, and/or algorithms. Although only one controller 134 is shown in FIG. 1, alternative embodiments of the autonomous vehicle 100 can include any number of controllers 134 that communicate over any suitable communication medium or a combination of communication mediums and that cooperate to process the sensor signals, perform logic, calculations, methods, and/or algorithms, and generate control signals to automatically control features of the autonomous vehicle 100.

In various embodiments, one or more instructions of the controller 134 are embodied to provide ADS functions as described with reference to one or more of the embodiments herein. The controller 134 or one of its functional modules is configured to implement the functions described in accordance with traffic light ROI parameters received from embodiments of a traffic light ROI management system 152 at an ECS 150.

Figure 2:
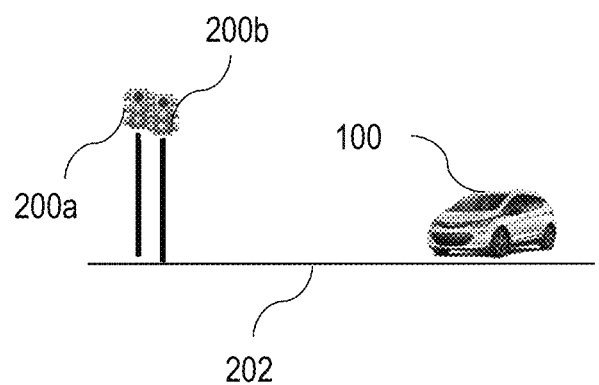
FIG. 2 is a diagrammatic representation of an autonomous vehicle capturing a sequence of images including traffic lights for transmission to an ECS including an embodiment of a traffic light ROI management system.

Referring to FIG. 2, a diagrammatic representation of an autonomous vehicle 100 capturing a sequence of images including traffic lights 200a, 200b for transmission to an ECS 150 including an embodiment of a traffic light ROI management system 152 is shown. The autonomous vehicle 100 includes a vehicle sensor system 128 and a vehicle communication system 136. The vehicle sensor system 128 includes one or more vehicle sensing devices 140a-140n. Examples of vehicle sensing devices 140a-140n include, but are not limited to, radars, lidars, global positioning system (GPS), optical cameras, thermal cameras, ultrasonic sensors, and/or other sensors.

The vehicle sensor system 128 is configured to capture a sequence of images as the autonomous vehicle 100 approaches the traffic lights 200a, 200b on a road segment 202. Each image in the sequence of images includes the traffic lights 200a, 200b. The vehicle sensor system 128 is configured to identify a vehicle location of the autonomous vehicle 100 at the time each image is captured by the vehicle sensor system 128 and associate the vehicle location with the image. The images in the sequence of images are in a forward time order. The images are arranged in the order that the images were captured by the vehicle sensor system 128. For example, the first image in the sequence of images is the oldest image in the sequence and the last image in the sequence of images is the more recent image in the sequence. The vehicle communication system 136 is configured to transmit the sequence of images and the vehicle location associated with each of the images to the traffic light ROI management system 152 at the ECS 150. While two traffic lights 200a, 200b are shown on the road segment 202, the road segment 202 may include a fewer or greater number of traffic lights.

Figure 3:
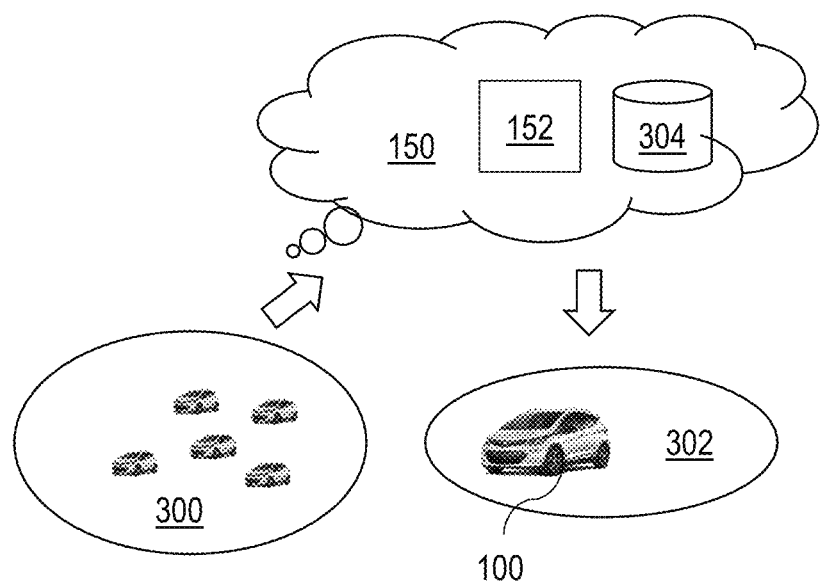
FIG. 3 is a diagrammatic representation of a plurality of autonomous vehicles communicatively coupled to an ECS including an embodiment of a traffic light ROI management system.

Referring to FIG. 3, a diagrammatic representation of a plurality of autonomous vehicles 100 communicatively coupled to an ECS 150 including an embodiment of a traffic light ROI management system 152 is shown. Each of a plurality of autonomous vehicles 100 in a group 300 is configured to capture a sequence of images as the autonomous vehicle 100 approaches the traffic lights 200a, 200b on a road segment 202 for transmission to an ECS 150 including an embodiment of a traffic light ROI management system 152. Each of the autonomous vehicles 100 is configured to transmit the sequence of images and a vehicle associated with each of the images to the traffic light ROI management system 152 at the ECS 150. While the number of autonomous vehicles 100 in the group 300 is shown as five autonomous vehicles 100, the group 300 may include a greater or fewer number of autonomous vehicles 100.

The traffic light ROI management system 152 is configured to receive the sequence of images from each of the autonomous vehicles 100 in the group 300. The traffic light ROI management system 152 is configured to process each sequence of images individually. The traffic light ROI management system 152 is configured to perform reverse object (traffic light) detection and tracking on each of the sequence of images to generate a ECS traffic light ROI for each of the images in the sequence of images including traffic lights that exceed a traffic light size threshold.

In an embodiment, the traffic light ROI management system 152 is configured to generate ROI scaling ratios associated with each of the vehicle locations of the images based on a movement of the ECS traffic light ROI in the sequence of images. The traffic light ROI management system 152 is configured to determine ECS ROI offsets of the ECS traffic light ROI in consecutive pairs of images in the sequence of images. Each ROI offset is based on a movement of the ECS traffic light ROI in the consecutive pairs of images. Each ROI offset represents movement of the position of ECS traffic light ROI from a position in the first one of the pair of consecutive images to a position in the second one of the pair of consecutive images. The movement of the ECS traffic light ROI as a function of the vehicle location on the road segment 202 defines the topology of the road segment 202. The traffic light ROI management system 152 is configured to generate a ROI scaling ratio for each of the vehicle locations associated with each of the images in the sequence of images based on a relationship between each of the ROI offsets and the vehicle location associated with the ROI offset.

The traffic light ROI management system 152 is configured to map each ROI scaling ratio to a vehicle location on a high definition (HD) map including the road segment 202. The vehicle location on the HD map is associated with the ROI scaling ratio. The HD map is stored at an ECS database 304. The traffic light ROI management system 152 is configured to repeat this process with each of the sequence of images received from the autonomous vehicles 100 in the group 300 to define, refine and/or update the ROI scaling ratio for each of a plurality of vehicle locations on the road segment 202. In an embodiment, the traffic light ROI management system 152 is configured to only generate ROI scaling ratios for vehicle locations associated images in the sequence of images that include traffic lights that exceed the traffic light size threshold.

In an embodiment, the traffic ROI management system 152 is configured to receive the ECS traffic light ROIs and the vehicle locations associated with each of the images in the image sequence that include the ECS traffic light ROIs. The traffic light ROI management system 152 is configured to generate a visual feature template for each of the ECS traffic light ROI. In an embodiment, the traffic ROI management system 152 is configured to generate the visual feature template for each of the ECS traffic light ROI in the frequency domain by applying a Fast Fourier transform to the ECS traffic light ROI.

The traffic light ROI management system 152 is configured to map each visual feature template to a vehicle location on a high definition (HD) map including the road segment 202. The vehicle location on the HD map is associated with the image in the image sequence that includes the ECS traffic light ROI associated with the visual feature template. The HD map is stored at the ECS database 304. The traffic light ROI management system 152 is configured to repeat this process with each of the sequence of images received from the autonomous vehicles 100 in the group 300 to define, refine and/or update the visual feature template for each of a plurality of vehicle locations on the road segment 202. In an embodiment, the traffic light ROI management system 152 is configured to only generate visual feature templates for vehicle locations associated images in the sequence of images that include traffic lights that exceed the traffic light size threshold.

In an embodiment, the traffic light ROI management system 152 is configured to identity the ECS traffic light ROI that include robust visual features. Each of the ECS traffic light ROI identified as having robust visual features are based on an image associated with a vehicle location. In an embodiment, the identified ECS traffic light ROI are associated with the vehicle location on the road segment 202 associated with the image that the ECS traffic light ROI is based on. In an embodiment, the identified ECS traffic light ROI may be associated with multiple vehicle locations on the road segment 202.

The traffic light ROI management system 152 is configured to transmit the HD map to an autonomous vehicle 100, 302. The HD map includes the ROI scaling ratios and visual feature templates mapped to different vehicle locations on the road segment 202. The ROI scaling ratios and the visual feature templates may be referred to as traffic light ROI parameters. In an embodiment, the traffic light ROI management system 152 is configured to transmit HD maps including the ROI scaling ratios and visual feature templates mapped to the vehicle locations on the road segments 202 including traffic lights 200a, 220b in an area within a predefined vicinity of a location of the autonomous vehicle 100, 302. In an embodiment, the traffic light ROI management system 152 is configured to transmit HD maps including the ROI scaling ratios and the visual feature templates mapped to vehicle locations on road segments 202 including traffic lights 200a, 200b on a route that the autonomous vehicle 100, 302 is expected to take, for example on a road trip.

The autonomous vehicle 100, 302 includes a vehicle sensor system 128. The vehicle sensor system 128 includes one or more vehicle sensing devices 140a-140n. Examples of vehicle sensing devices 140a-140n include, but are not limited to, radars, lidars, global positioning system (GPS), optical cameras, thermal cameras, ultrasonic sensors, and/or other sensors.

The vehicle sensor system 128 is configured to capture real-time images as the autonomous vehicle 100, 302 approaches the traffic lights 200a, 200b on a road segment 202 and generate a real-time traffic light ROI including the traffic lights 200a, 200b for each of the captured real-time images. An uneven or bumpy topology of the road segment 202 may cause the traffic lights 200a, 200b to "jump" outside the real-time traffic light ROI. In an embodiment the autonomous vehicle 100, 302 is configured to identity the ROI scaling ratios in the HD map mapped to the vehicle location of the autonomous vehicle 100, 302 on the road segment 202 and apply the ROI scaling ratio to the real-time image captured at the vehicle location.

The autonomous vehicle 100, 302 is configured to adjust a size of the real-time traffic light ROI in accordance with the ROI scaling ratio. Adjusting the size of the real-time traffic light ROI in each of the real-time images captured by the autonomous vehicle 100, 302 using a ROI scaling ratio may ensure that the traffic lights 200a, 200b remain within the real-time traffic light ROI during changes in topology of the road segment 202 leading up to the traffic lights 200a, 200b and enable the ADS of the autonomous vehicle 100, 302 to take appropriate action based on a status of the traffic lights 200a, 200b on the road segment 202. An onboard traffic light object detection algorithm at the autonomous vehicle 100, 302 is used to process the traffic light ROI to detect the traffic lights in the traffic light ROI.

In an embodiment the autonomous vehicle 100, 302 is configured to identity the visual feature template in the HD map mapped to the vehicle location of the autonomous vehicle 100, 302 on the road segment 202. The autonomous vehicle 100, 302 is configured to identify a real-time traffic light ROI in a real-time image captured by the vehicle sensor system 128 at the vehicle location based on a match between the identified visual feature template and the real-time visual features associated with the real-time image. An onboard traffic light object detection algorithm at the autonomous vehicle 100, 302 is used to process the traffic light ROI to detect the traffic lights in the traffic light ROI. While the group 302 that receives the HD maps including at least one of the ROI scaling ratios and the visual feature templates is shown as a single autonomous vehicle 100, the group 302 may include a greater number of autonomous vehicles 100, 302.

Figure 4:
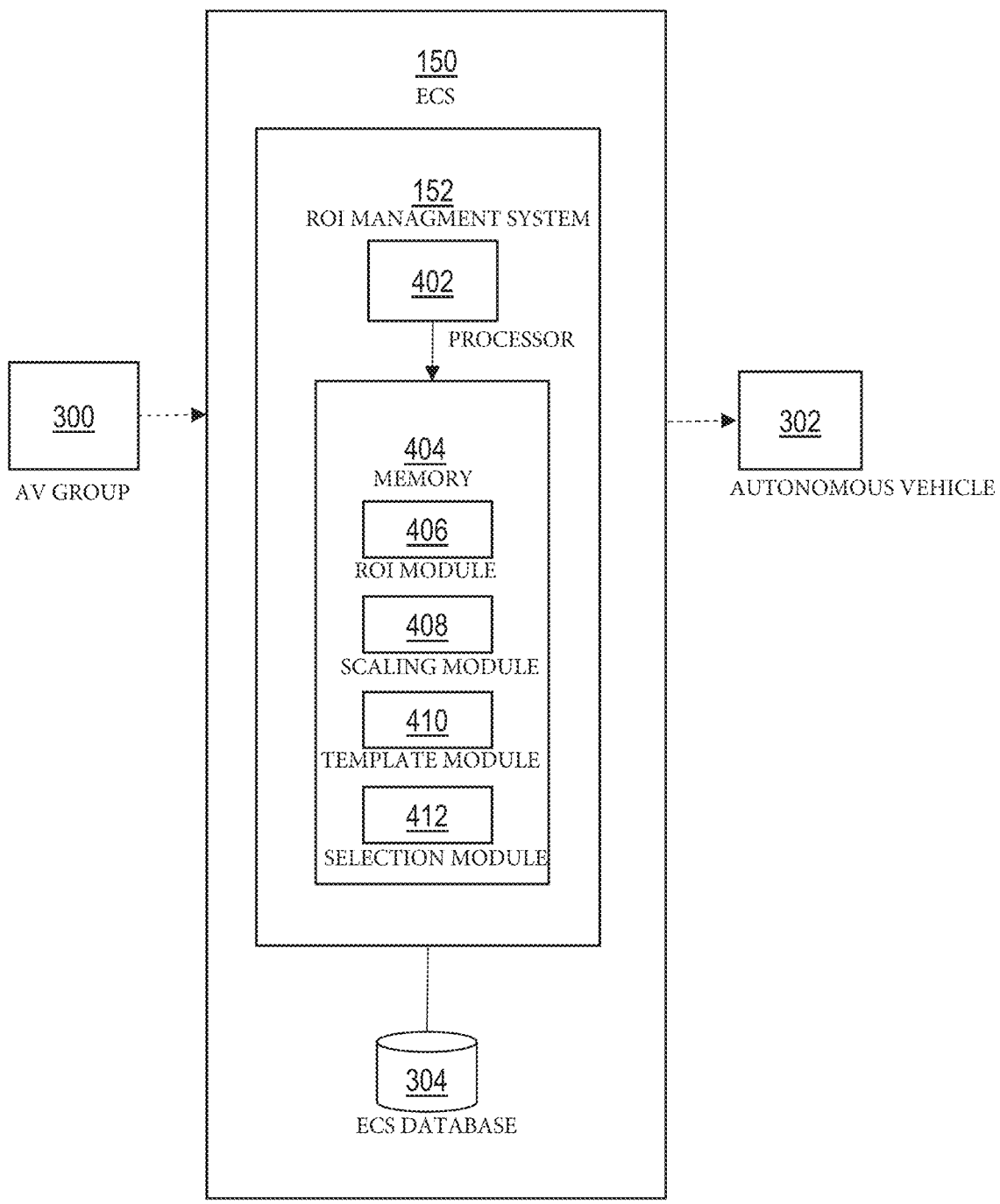
FIG. 4 is a functional block diagram representation of an ECS including an embodiment of a traffic light ROI management system.

Referring to FIG. 4, a functional block diagram representation of an ECS 150 including an embodiment of a traffic light ROI management system 152 shown. The ECS 150 is configured to be communicatively coupled to autonomous vehicles 100 represented by the group 300 to receive the sequences of images and to autonomous vehicles 100 represented by the group 302 to transmits HD maps including at least one of ROI scaling ratios and visual feature templates associated with different vehicle locations on road segments 202 including traffic lights 200a, 200b. The ROI scaling ratios and the visual feature templates may be referred to as traffic light ROI parameters.

In an embodiment, the ECS 150 includes the ECS traffic light ROI management system 152 and a ECS database 304. In an embodiment, the ECS traffic light ROI management system 152 includes one or more processors 402, a memory 404 and a ECS database 304. In an embodiment, the memory 404 includes a traffic light ROI module 406 and a ROI scaling ratio module 408. In an embodiment, the memory 404 includes a traffic light ROI module 406 and a visual feature template module 410. In an embodiment, the memory 404 includes a traffic light ROI module 406, a ROI scaling ratio module 408, and a visual feature template module 410. In an embodiment, the memory 404 includes a template selection module 412. The ECS 150 may include other components that facilitate the operation of the ECS 150.

Figure 5:
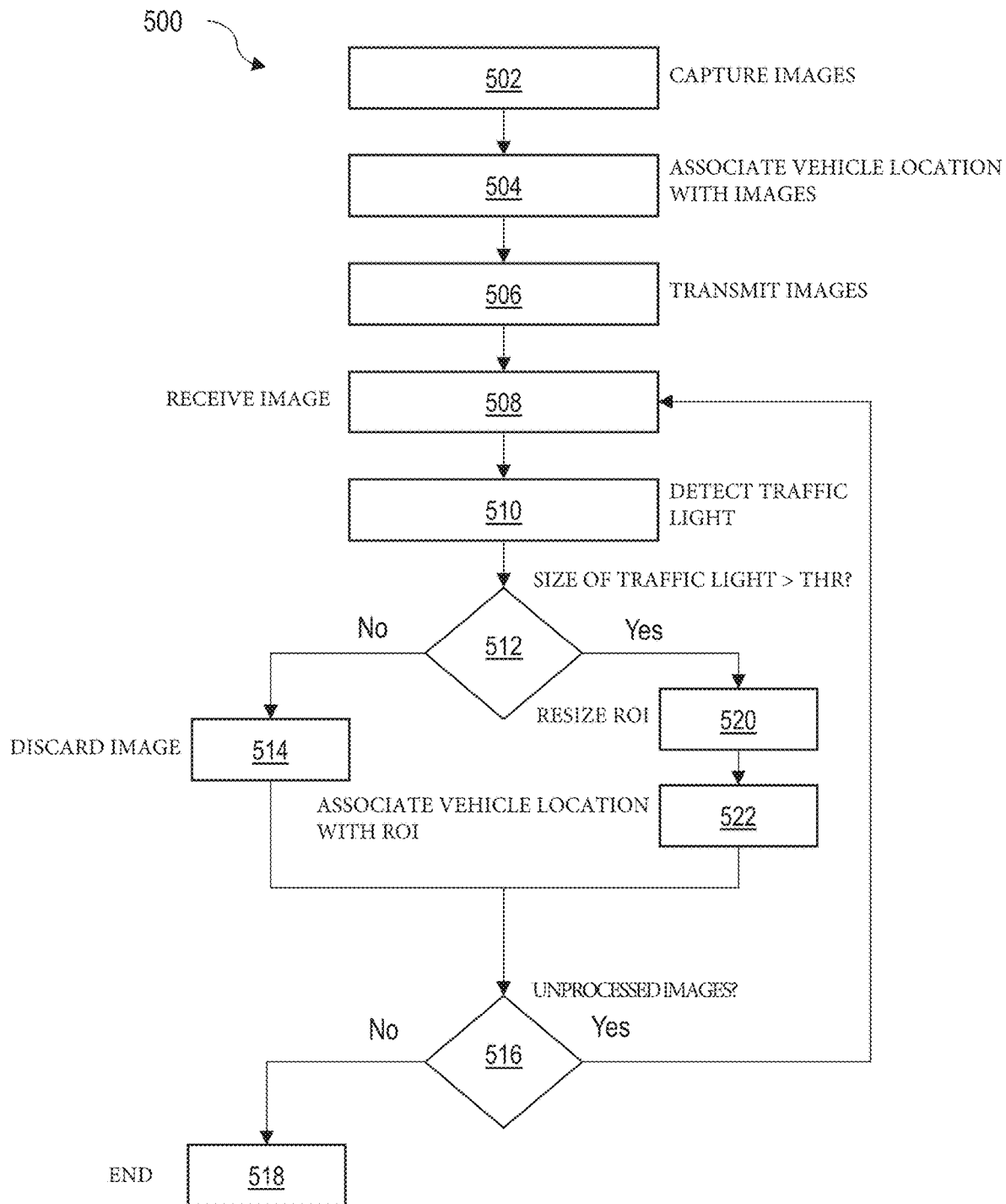
FIG. 5 is a flowchart representation of an example of a method of generating a plurality of ECS traffic light ROI based on a sequence of images received from an autonomous vehicle using an embodiment of a traffic light ROI management system.

Referring to FIG. 5, a flowchart representation of an example of a method 500 of generating a plurality of ECS traffic light ROI based on a sequence of images received from an autonomous vehicle 100, 300 using an embodiment of a traffic light ROI management system 152 is shown. The method 500 may be performed by hardware circuitry, firmware, software, and/or combinations thereof.

At 502, a sequence of images is captured by a vehicle sensor system 128 of an autonomous vehicle 100, 300 as the autonomous vehicle 100, 300 approaches one or more traffic lights 200a, 200b on a road segment 202. The images in the sequence of images are arranged in a forward time order. The images are arranged in the order that the images were captured by the vehicle sensor system 128. For example, the first image in the sequence of images is the oldest image in the sequence and the last image in the sequence of images is the more recent image in the sequence.

At 504, the autonomous vehicle 100, 300 associates a vehicle location with each of the images in the sequence of images. The vehicle sensor system 128 is configured to capture vehicle locations of the autonomous vehicle 100, 300 as the autonomous vehicle 100, 300 travels on the road segment 202 towards the traffic lights 200a, 200b. The vehicle location at which each image in the sequence images was captured by the vehicle sensor system 128 is associated with that image. At 506, the autonomous vehicle 100, 300 transmits the sequence of images and the vehicle location associated with each of the images to the traffic light ROI management system 152 at the ECS 150.

The traffic light ROI management system 152 applies a reverse object detection and tracking algorithm to each of the images the sequence of images in a reverse time order. In a reverse time order of the images, the first image is the most recent image in the sequence and the last image is the oldest image in the sequence. At 508, the traffic light ROI module 406 receives an image from the reverse time ordered sequence of images.

At 510, the traffic light ROI module 406 uses an object tracking algorithm to detect the traffic lights 200a, 200b in the image. In an embodiment, each detected traffic light 200a, 200b in the image is represented as bounding box. At 512, the traffic light ROI module 406 determines whether the size of each of the detected traffic lights 200a, 200b represented as bounding boxes in the image is greater than a traffic light size threshold.

If the traffic light ROI module 406 determines that the size of each of the detected traffic lights 200a, 200b represented as bounding boxes in the image is not greater than the traffic light size threshold, the traffic light ROI module 406 discards the image at 514. At 516, the traffic light ROI module 406 determines whether there are any unprocessed images remaining in the sequence of images. If ECS traffic light ROI module 406 determines that there are unprocessed images remaining in the sequence of images the method 500 returns to 508 and the next image in the reverse time ordered image sequence is received by the traffic light ROI module 406 for processing. If the traffic light ROI module 406 determines that there are no unprocessed images remaining in the sequence of images the method 500 ends at 518.

If the traffic light ROI module 406 determines that the size of each of the detected traffic lights 200a, 200b represented as bounding boxes in the image is greater than the traffic light size threshold, the traffic light ROI module 406 generates an ECS traffic light ROI that encloses the detected traffic lights 200a, 200b represented as bounding boxes in the image at 520. At 522, the traffic light ROI module 406 associates the vehicle location associated with the image with the ECS traffic light ROI. The method 500 proceeds to 516.

At 516, the traffic light ROI module 406 determines whether there are any unprocessed images remaining in the sequence of images. If the traffic light ROI module 406 determines that there are unprocessed images remaining in the sequence of images the method 500 returns to 508 and the next image in the reverse time ordered image sequence is received by the traffic light ROI module 406 for processing. If the traffic light ROI module 406 determines that there are no unprocessed images remaining in the sequence of images the method 500 ends at 518.

The method 500 generates a plurality of traffic light ROI based on a sequence of images received from an autonomous vehicle 100, 300 as an output. The traffic light ROI management system 152 uses the plurality of traffic light ROI to generate traffic light ROI parameters. In an embodiment, the traffic light ROI parameters are ROI scaling ratios. In an embodiment, the traffic light ROI parameters are visual feature templates. In an embodiment the traffic light ROI parameters include both ROI scaling ratios and visual feature templates.

Figure 6A:
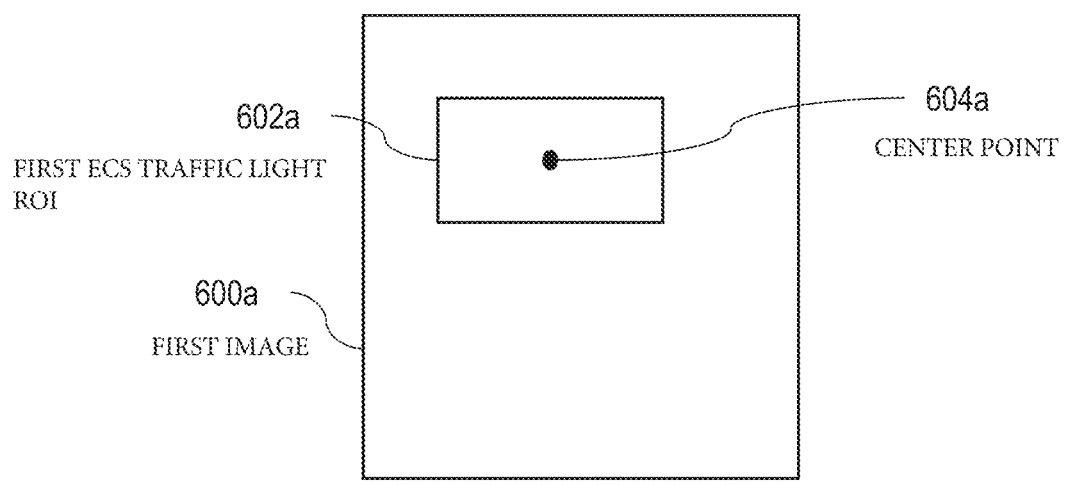
FIG. 6a and FIG. 6b are block diagram representations of examples of ECS traffic light ROI positions in a pair of consecutive images in the sequence of images.
Figure 6B:
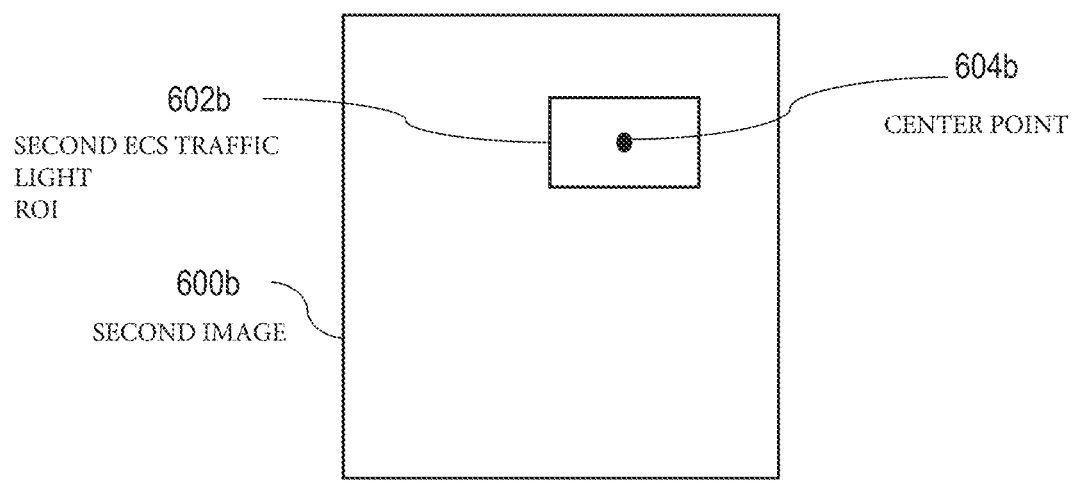

Referring to FIG. 6a and FIG. 6b, block diagram representations of examples of ECS traffic light ROI positions in a pair of consecutive images 600a, 600b in the sequence of images is shown. In an embodiment, the ROI scaling ratio module 408 receives the sequence of images and the plurality of ECS traffic light ROI based on the sequence of images. The ROI scaling ratio module 408 is configured to generate ROI scaling ratios based on a movement of the ECS traffic light ROI in the sequence of images.

The first image 600a includes a first ECS traffic light ROI 602a and the second image 600b includes a second ECS traffic light ROI 602b. The first and second images 600a, 600b are the same size. The first and second images 600a, 600b may be defined by an x, y coordinate system, where the x axis runs along a width of each of the first and second images 600a, 600b and the y-axis runs along a height of each of the first and second images 600a, 600b. The first ECS traffic light ROI 602a and the second ECS traffic light ROI 602b may be different sizes.

In the example, a position of a center point 604a of the first ECS traffic light ROI 602a is represented by the coordinates $(x_i, y_i)$. A position of a center point 604b of the second ECS traffic light ROI 602b is represented by the coordinates $(x_{i+1}, y_{i+1})$. The distance $d_i$ represents the movement of the ECS traffic light ROI in consecutive images. In the example, the distance $d_i$ represents the movement of the position of the center point 604a at $(x_i, y_i)$ to the position of the center point 604b at $(x_{i+1}, y_{i+1})$. The distance $d_i$ can be referred to as the ROI offset or the ROI movement. The distance $d_i$ is defined as a function of the movement of the positions of the center points 604a, 604b of the first and second ECS traffic light ROIs 602a, 602b in the first and second images 600a, 600b as shown below.

$$d_i = \text{distance}((x_i, y_i), (x_{i+1}, y_{i+1}))$$

Figure 10:
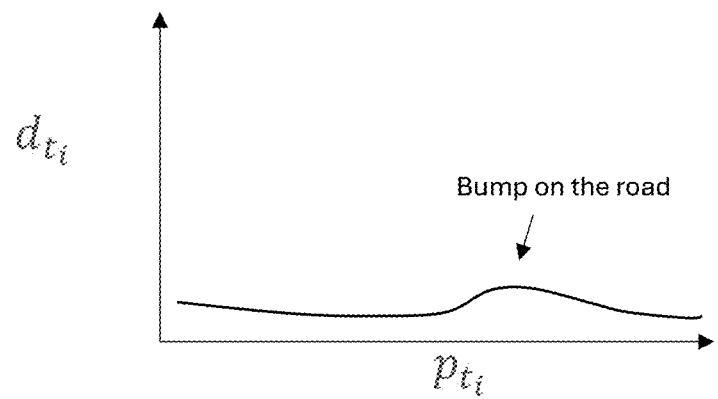
FIG. 10 is a graph showing a relationship between a distance and a vehicle position.

In the example, the first image 600a was captured at a first vehicle location $p_i$ and the second image 600b was captured at a second vehicle location $p_{i+1}$. The distance $d_i$ is associated with the position $p_i$. The distance $d_{i-1}$ is associated with the position $p_{i-1}$. The distance d with respect to the corresponding position p is calculated for each of the consecutive pairs of images in the image sequence. An example of a graph that may represent the relationship between the distance d (also referred to as the ROI offset or the movement of the ECS traffic light ROI) as a function of vehicle position p is shown in FIG. 10.

The ROI offset as a function of the vehicle location on a road segment 202 defines a topology of the road segment 202. For example, as shown in the graph, a relatively larger value of the ROI offset indicates that a position of a bump present in the road segment 202. The ROI scaling ratio module 408 is configured to generate a ROI scaling ratio for each of the vehicle locations associated with each of the images in the sequence of images including a ECS traffic light ROI based on the ROI offset associated with that vehicle location. The ROI scaling ratio is a traffic ROI parameter. The ROI scaling ratio module 408 is configured to map the ROI scaling ratio associated with the different vehicle locations on the road segment 202 to a HD map including the road segment 202. The HD map including the mapped ROI scaling ratios are stored in the ECS database 304.

In an embodiment, the visual feature template module 410 is configured to receive the ECS traffic light ROIs and the vehicle locations associated with each of the images in the image sequence that include the ECS traffic light ROIs. The visual feature template module 410 is configured to generate a visual feature template for each of the ECS traffic light ROI. In an embodiment, the visual feature template module 410 is configured to generate the visual feature template for each of the ECS traffic light ROI in the frequency domain by applying a Fast Fourier transform to the ECS traffic light ROI.

The visual feature template module 410 is configured to map each visual feature template to a vehicle location on a high definition (HD) map including the road segment 202. The vehicle location on the HD map is associated with the image in the image sequence that includes the ECS traffic light ROI associated with the visual feature template. The HD map is stored at the ECS database 304. The visual feature template module 410 is configured to repeat this process with each of the sequence of images received from the autonomous vehicles 100 in the group 300 to define, refine and/or update the visual feature template for each of a plurality of vehicle locations on the road segment 202. In an embodiment, the visual feature template module 410 is configured to only generate visual feature templates for vehicle locations associated images in the sequence of images that include traffic lights that exceed the traffic light size threshold.

In an embodiment, the template selection module 412 is configured to receive the sets of visual feature templates and the sequences of images received from different autonomous vehicles 100, 300 that previously travelled on the road segment 202 towards the traffic lights 200a, 200b. The template selection module 412 is configured to generate a reduced set of visual feature templates that can be used by an autonomous vehicle 100, 302 to identify real-time traffic light ROIs in real-time images captured by autonomous vehicles 100, 302 that travel on the road segment 202 towards the traffic lights 200a, 200b. The use of a reduced set of visual feature templates may reduce the footprint of the visual feature templates associated with a road segment 202 and may reduce memory needed to store the visual feature templates.

Figure 7:
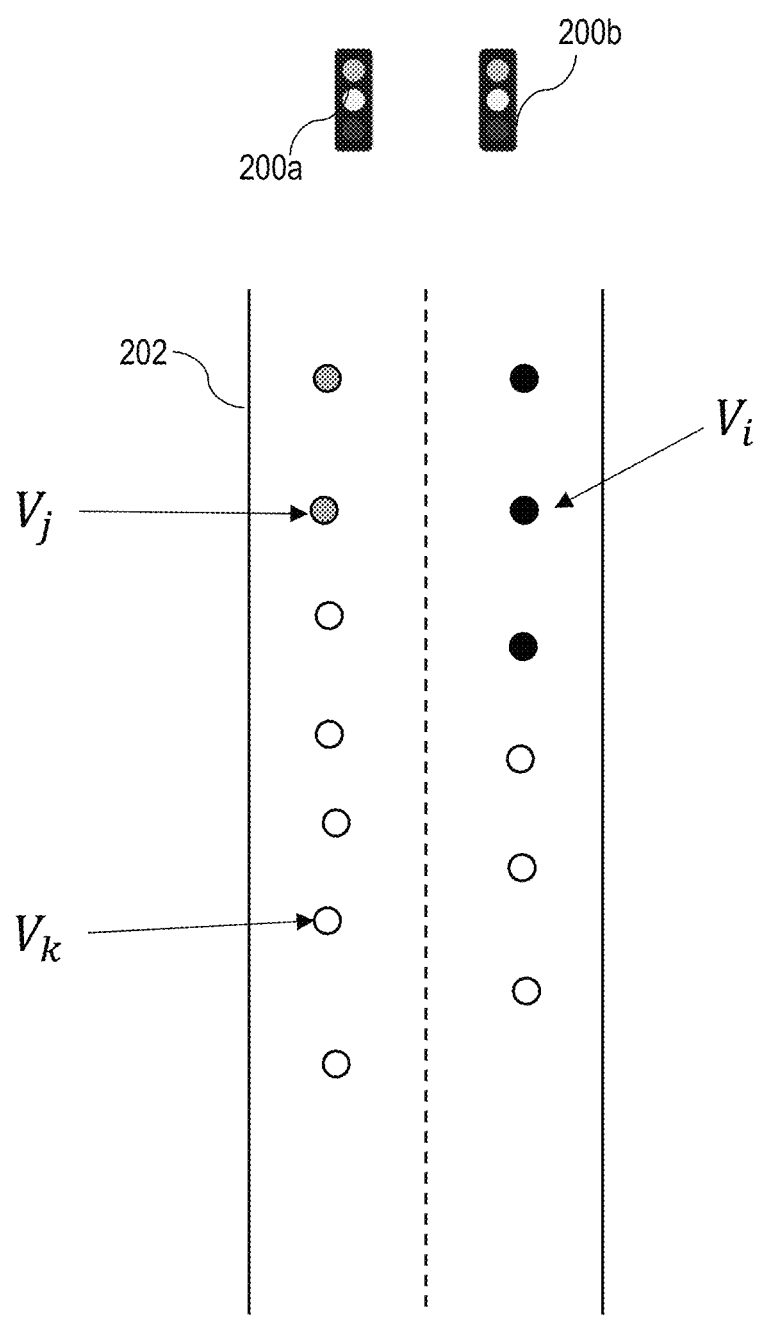
FIG. 7 is a diagrammatic representation of an example of associations between each of plurality of visual feature templates and a plurality of vehicle locations on a road segment including traffic lights.

Referring to FIG. 7, a diagrammatic representation of an example of associations between each of plurality of visual feature templates and a plurality of vehicle locations on a road segment 202 including traffic lights 200a, 200b is shown. The vehicle locations are represented as circles on the road segment 202. The template selection module 412 is configured to select a subset of the visual feature templates generated by the visual feature template module 410 to map to the HD map.

In an embodiment, each visual feature template is a frequency domain representation of the ECS traffic light ROI associated with an image previously captured by an autonomous vehicle 100, 300 at a vehicle location on the road segment 202. The template selection module 412 is configured to use the frequency domain representation of each of the images in the sequences of images received from autonomous vehicles 100, 300 on the road segment 202 to predict the ECS traffic light ROI of images captured in nearby vehicle locations and identify the visual feature templates that can be used at multiple vehicle locations on the road segment 202.

For example, in FIG. 7, the visual feature template $V_i$ can be used to correctly determine a real-time traffic light ROI at each of the vehicle locations represented by the black dots, the visual feature template $V_j$ can be used to correctly determine a real-time traffic light ROI in each of the vehicle locations represented by the gray dots and $V_k$ can be used to correctly determine a real-time traffic light ROI in each of the vehicle locations represented by the white dots.

The set of visual feature templates generated by the visual feature template module 410 for the road segment 202 may, for example, include thirteen different visual feature templates. The template selection module 412 identified a reduced set of the visual feature templates $V_i$, $V_j$, $V_k$ that can be used to determine real-time traffic light ROI in real-time images captured by future autonomous vehicles 100, 302 at the potential vehicle locations represented by the circles on a road segment 202. Each of the visual feature templates in the reduced set is mapped to the vehicle locations on the road segment 202 where the visual feature template can be used to determine real-time traffic light ROIs.

Figure 8:
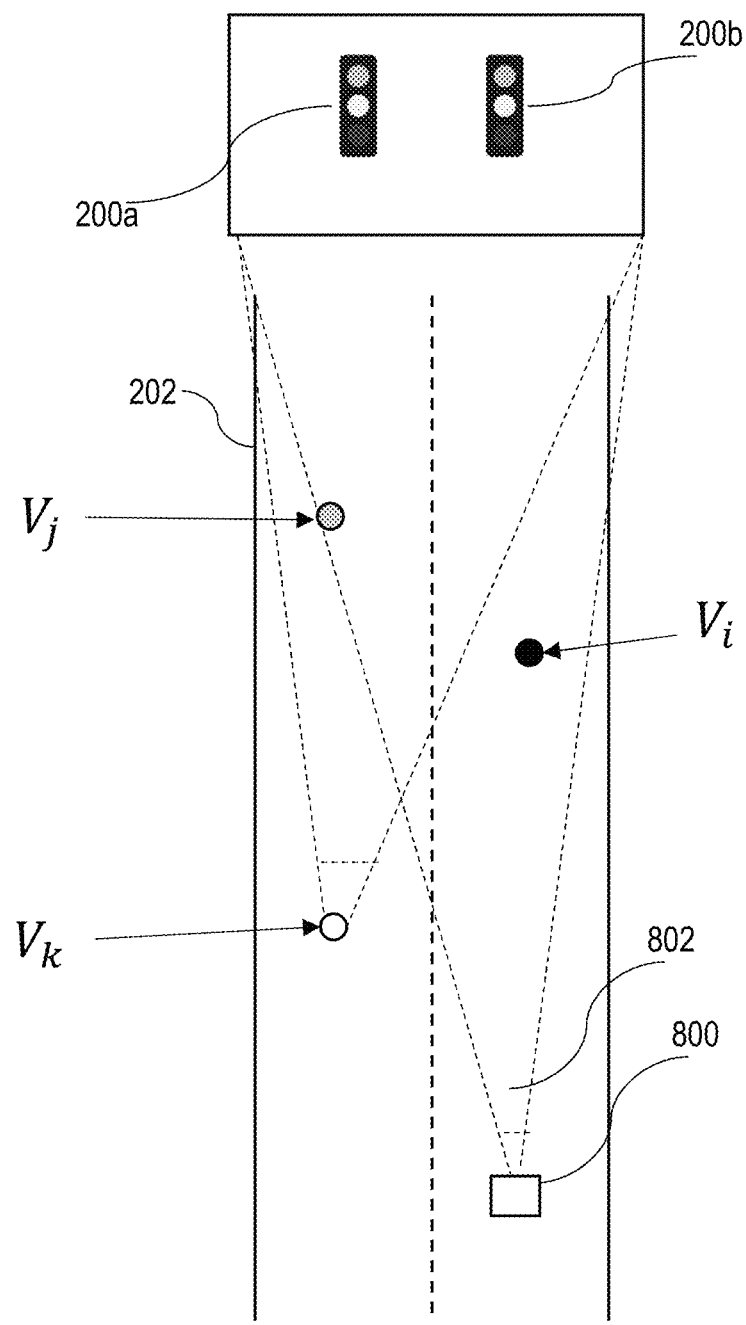
FIG. 8 is a diagrammatic representation of an example of a vehicle location of an autonomous vehicle and vehicle locations associated with a plurality of visual feature templates on a road segment including traffic lights.

Referring to FIG. 8, a diagrammatic representation of an example of a vehicle location 800 of an autonomous vehicle 100 and vehicle locations associated with a plurality of visual feature templates $V_i$, $V_j$, $V_k$ on a road segment 202 including traffic lights 200a, 200b is shown. The vehicle locations are represented as circles on the road segment 202. In the example, the visual feature template $V_i$ can be used to correctly determine a real-time traffic light ROI at the vehicle location represented by the black dot, the visual feature template $V_j$ can be used to correctly determine a real-time traffic light ROI at the vehicle location represented by the gray dot, and $V_k$ can be used to correctly determine a real-time traffic light ROI at the vehicle location represented by the white dot. The autonomous vehicle 100 is disposed at a vehicle location 800 represented by the square. The HD map does not include a visual feature template associated with the vehicle location 800.

The autonomous vehicle 100 is configured to run a visual feature template scaling algorithm in real-time. The visual feature template scaling algorithm calculates a visual feature template scaling ratio using a size $ROISize_{vehicle}$ of the traffic light ROI at the autonomous vehicle 100 and a size $ROISize_{Vj}$ of a visual feature template $V_j$ associated with another vehicle location on the road segment 202 within an area represented by an observation angle 802 associated with the vehicle location 800 of the autonomous vehicle 100. The visual feature template $V_j$ is in the frequency domain. The visual feature template scaling ratio is calculated using the equation below.

$$\text{Visual feature template scaling ratio} = \frac{ROISize_{vehicle}}{ROISize_{V_j}}$$

The visual feature template scaling algorithm applies the visual feature template scaling ratio to the visual feature template $V_j$ to generate a scaled version of the visual feature template $V_j$. The autonomous vehicle 100 uses the scaled version of the visual feature template $V_j$ to identify the real-time traffic light ROI in a real-time image captured by the autonomous vehicle 100 at the vehicle location 800.

Figure 9:
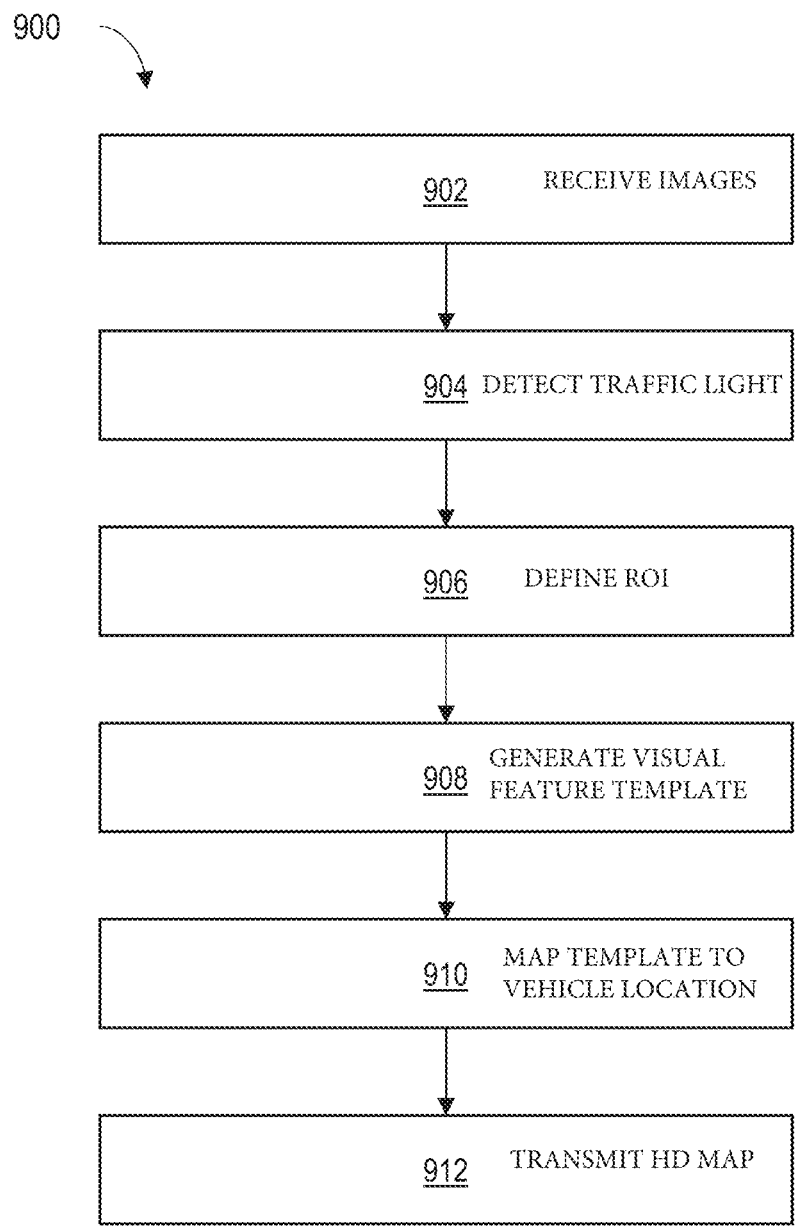
FIG. 9 is a flowchart representation of a method of providing traffic light ROI parameters to an autonomous vehicle.

Referring to FIG. 9, an example of a method 900 of providing traffic light ROI parameters to an autonomous vehicle using an embodiment of a traffic light ROI management system 152 at an ECS 150 is shown. The method 900 is performed by the traffic light ROI management system 152. The method 1000 may be performed by the traffic light ROI management system 152 in combination with other components of the ECS 150. The method 900 may be performed by hardware circuitry, firmware, software, and/or combinations thereof.

At 902, a sequence of images and a vehicle location associated with each of the images is received from a first autonomous vehicle 100, 300 at a traffic light ROI management system 152. At 904, at least one traffic light 200a, 200b is detected in each image in the sequence of images at the traffic light ROI management system 152. At 906, a ECS traffic light ROI for each image in the sequence of images is defined at the traffic light ROI management system 152. The ECS traffic light ROI for each image encloses the at least one traffic light 202a, 202b in the image. At 908, a visual feature template is generated for each image in the sequence of images at the traffic light ROI management system 152. The visual feature template for each image is based on the ECS traffic light ROI for the image. At 910, each visual feature template for each image in the sequence of images is mapped to the vehicle location associated with the image to a high definition (HD) map at the traffic light ROI management system 152. At 912, the HD map is transmitted from the traffic light ROI management system 152 to a second autonomous vehicle 100, 302 to enable the second autonomous vehicle 100, 302 to identify a real-time traffic light ROI in a real-time image based on a match between a first visual feature template of the HD map and real-time visual features associated with the real-time image at the vehicle location associated with the first visual feature template. An onboard traffic light object detection algorithm at the autonomous vehicle 100 is used to process the traffic light ROI to detect the traffic lights in the traffic light ROI.

The use of a traffic light ROI management system 152 at an edge computing system 150 may reduce computer resource usage at autonomous vehicles 100. The use of crowd-source vehicle sensor data to create intersection models and traffic light models may reduce computer resource usage at autonomous vehicles 100. The generation of traffic light ROI parameters at the edge computing system 150 based on crowd-source vehicle sensor data for use by autonomous vehicles 100 in real-time may enable autonomous vehicles 100 to identify real-time traffic light ROIs in real-time images with greater precision and compensate for complex road topologies.

Processing a full-resolution image in an autonomous vehicle on-board traffic light detection algorithm may make the algorithm very slow to run. Extracting a smaller sub-image (Region of Interest) from the full-resolution image which includes traffic lights in this sub-image, prior to running the traffic light object detection algorithm may address this problem. Extracting a small sub-image (ROI) before running the full complex traffic light detection algorithms may effectively reduce the response time of the real-time traffic light detection algorithms.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It is to be understood that various changes can be made in the function and arrangement of elements without departing from the scope of the disclosure as set forth in the appended claims and the legal equivalents thereof.

What is claimed is:

1. An edge computing system (ECS) for providing traffic light region of interest (ROI) parameters to an autonomous vehicle comprising:
   a processor; and
   a memory, the memory including instructions that upon execution by the processor cause the processor to:

receive a sequence of images and a vehicle location associated with each of the images from a first autonomous vehicle;

detect at least one traffic light in each image in the sequence of images;

define a ECS traffic light ROI for each image in the sequence of images, the ECS traffic light ROI for each image enclosing the at least one traffic light in the image;

generate a visual feature template for each image in the sequence of images, the visual feature template for each image being based on the ECS traffic light ROI for the image;

map each visual feature template for each image in the sequence of images to the vehicle location associated with the image to a high definition (HD) map; and transmit the HD map to a second autonomous vehicle to enable the second autonomous vehicle to identify a real-time traffic light ROI in a real-time image based on a match between a first visual feature template of the HD map and real-time visual features associated with the real-time image at the vehicle location associated with the first visual feature template.

2. The system of claim 1, wherein each of the images in the sequence of images is in a forward time order and the memory further includes instructions that upon execution by the processor cause the processor to define the ECS traffic light ROI in each image in the sequence of images in a reverse time order.

3. The system of claim 2, wherein the memory further includes instructions that upon execution by the processor cause the processor to discard a first image of the sequence of images upon a determination that the at least one detected traffic light in first image falls below a traffic light size threshold.

4. The system of claim 1, wherein the memory further includes instructions that upon execution by the processor cause the processor to generate the visual feature template for each image in the sequence of images in the frequency domain by applying a Fast Fourier transform to the ECS traffic light ROI of the image.

5. The system of claim 1, wherein the memory further includes instructions that upon execution by the processor cause the processor to:

select a second visual feature template based on a first image of the sequence of images, the first image being associated with a first vehicle location;

determine whether the second visual feature template can be used to identify a first ECS traffic light ROI in a second image of the sequence of images based on a match between the second visual feature template and visual features associated with the second image, the second image being associated with a second vehicle location; and map the second visual feature template to the first and second vehicle locations on the HD map based on the determination.

6. The system of claim 1, wherein the memory further includes instructions that upon execution by the processor cause the processor to:

determine ROI offsets of the ECS traffic light ROI in consecutive pairs of images in the sequence of images based on a movement of the ECS traffic light ROI in the consecutive pairs of images;

generate a ROI scaling ratio for each of the vehicle locations associated with each of the images in the sequence of images based a relationship between each of the ROI offsets and the vehicle location associated with the ROI offset; and map each ROI scaling ratio to the vehicle location on the HD map associated with the ROI scaling ratio.

7. The system of claim 6, wherein the memory further includes instructions that upon execution by the processor cause the processor to transmit the HD map including the mapped ROI scaling ratios to the second autonomous vehicle to enable the second autonomous vehicle to adjust a size of the real time traffic light ROI in the real-time image in accordance with the ROI scaling ratio associated with the vehicle location of the second autonomous vehicle.

8. A non-transitory computer readable medium comprising instructions stored thereon for providing traffic light region of interest (ROI) parameters to an autonomous vehicle, that upon execution by a processor, cause the processor to:

receive a sequence of images and a vehicle location associated with each of the images from a first autonomous vehicle;

detect at least one traffic light in each image in the sequence of images;

define a ECS traffic light ROI for each image in the sequence of images, the ECS traffic light ROI for each image enclosing the at least one traffic light in the image;

generate a visual feature template for each image in the sequence of images, the visual feature template for each image being based on the ECS traffic light ROI for the image;

map each visual feature template for each image in the sequence of images to the vehicle location associated with the image to a high definition (HD) map; and transmit the HD map to a second autonomous vehicle to enable the second autonomous vehicle to identify a real-time traffic light ROI in a real-time image based on a match between a first visual feature template of the HD map and real-time visual features associated with the real-time image at the vehicle location associated with the first visual feature template.

9. The non-transitory computer readable medium of claim 8, further comprising instructions to cause the processor to:

receive the sequence of images in a forward time order; and define the ECS traffic light ROI in each image in the sequence of images in a reverse time order.

10. The non-transitory computer readable medium of claim 9, further comprising instructions to cause the processor to discard a first image of the sequence of images upon a determination that the at least one detected traffic light in first image falls below a traffic light size threshold.

11. The non-transitory computer readable medium of claim 8, further comprising instructions to cause the processor to generate the visual feature template for each image in the sequence of images in the frequency domain by applying a Fast Fourier transform to the ECS traffic light ROI of the image.

12. The non-transitory computer readable medium of claim 9, further comprising instructions to cause the processor to:

select a second visual feature template based on a first image of the sequence of images, the first image being associated with a first vehicle location;

determine whether the second visual feature template can be used to identify a first ECS traffic light ROI in a second image of the sequence of images based on a match between the second visual feature template and visual features associated with the second image, the second image being associated with a second vehicle location; and map the second visual feature template to the first and second vehicle locations on the HD map based on the determination.

13. The non-transitory computer readable medium of claim 9, further comprising instructions to cause the processor to:

determine ROI offsets of the ECS traffic light ROI in consecutive pairs of images in the sequence of images based on a movement of the ECS traffic light ROI in the consecutive pairs of images;

generate a ROI scaling ratio for each of the vehicle locations associated with each of the images in the sequence of images based a relationship between each of the ROI offsets and the vehicle location associated with the ROI offset; and map each ROI scaling ratio to the vehicle location on the HD map associated with the ROI scaling ratio.

14. The non-transitory computer readable medium of claim 9, further comprising instructions to cause the processor to transmit the HD map including the mapped ROI scaling ratios to the second autonomous vehicle to enable the second autonomous vehicle to adjust a size of the real time traffic light ROI in the real-time image in accordance with the ROI scaling ratio associated with the vehicle location of the second autonomous vehicle.

15. A method of providing traffic light region of interest (ROI) parameters to an autonomous vehicle comprising:

receiving a sequence of images and a vehicle location associated with each of the images from a first autonomous vehicle at a traffic light ROI management system;

detecting at least one traffic light in each image in the sequence of images at the traffic light ROI management system;

defining a ECS traffic light ROI for each image in the sequence of images at the traffic light ROI management system, the ECS traffic light ROI for each image enclosing the at least one traffic light in the image;

generating a visual feature template for each image in the sequence of images at the traffic light ROI management system, the visual feature template for each image being based on the ECS traffic light ROI for the image;

mapping each visual feature template for each image in the sequence of images to the vehicle location associated with the image to a high definition (HD) map at the traffic light ROI management system; and transmitting the HD map from the traffic light ROI management system to a second autonomous vehicle to enable the second autonomous vehicle to identify a real-time traffic light ROI in a real-time image based on a match between a first visual feature template of the HD map and real-time visual features associated with the real-time image at the vehicle location associated with the first visual feature template.

16. The method of claim 15, further comprising:

receiving the sequence of images in a forward time order at the traffic light ROI management system; and defining the ECS traffic light ROI in each image in the sequence of images in a reverse time order at the traffic light ROI management system.

17. The method of claim 16, further comprising discarding a first image of the sequence of images upon a determination that the at least one detected traffic light in first image falls below a traffic light size threshold at the traffic light ROI management system.

18. The method of claim 15, further comprising generating the visual feature template for each image in the sequence of images in the frequency domain by applying a Fast Fourier transform to the ECS traffic light ROI of the image at the traffic light ROI management system.

19. The method of claim 15, further comprising:

selecting a second visual feature template based on a first image of the sequence of images at the traffic light ROI management system, the first image being associated with a first vehicle location;

determining whether the second visual feature template can be used to identify a first ECS traffic light ROI in a second image of the sequence of images based on a match between the second visual feature template and visual features associated with the second image at the traffic light ROI management system, the second image being associated with a second vehicle location; and mapping the second visual feature template to the first and second vehicle locations on the HD map based on the determination at the traffic light ROI management system.

20. The method of claim 15, further comprising:

determining ROI offsets of the ECS traffic light ROI in consecutive pairs of images in the sequence of images based on a movement of the ECS traffic light ROI in the consecutive pairs of images at the traffic light ROI management system;

generating a ROI scaling ratio for each of the vehicle locations associated with each of the images in the sequence of images based a relationship between each of the ROI offsets and the vehicle location associated with the ROI offset at the traffic light ROI management system; and mapping each ROI scaling ratio to the vehicle location on the HD map associated with the ROI scaling ratio at the traffic light ROI management system.

* * * * *